US007554102B2

(12) United States Patent
Liu et al.

(10) Patent No.: US 7,554,102 B2
(45) Date of Patent: Jun. 30, 2009

(54) OPTICAL COATING EQUIPMENT AND ULTRAVIOLET IRRADIATIVE DEVICE

(75) Inventors: Po-Tau Liu, Taipei (TW); Kuan-Kuo Lai, Taoyuan County (TW); Chin-Sung Chen, Taoyuan County (TW); Kun-Hsuan Yang, Chiayi (TW)

(73) Assignee: Daxon Technology Inc., Taoyuan (TW)

( * ) Notice: Subject to any disclaimer, the term of this patent is extended or adjusted under 35 U.S.C. 154(b) by 464 days.

(21) Appl. No.: 11/410,655

(22) Filed: Apr. 25, 2006

(65) Prior Publication Data

US 2007/0176127 A1 Aug. 2, 2007

(30) Foreign Application Priority Data

Jan. 27, 2006 (TW) .............................. 95103454 A

(51) Int. Cl.
*G03B 27/52* (2006.01)

(52) U.S. Cl. ................................. 250/492.1; 250/492.2

(58) Field of Classification Search .............. 250/492.1, 250/492.2; 156/275.5, 307.5; 430/296, 5
See application file for complete search history.

(56) References Cited

U.S. PATENT DOCUMENTS 4,801,979 A * 1/1989 Bourgeois .................. 355/106
2005/0016672 A1* 1/2005 Kim et al. ................ 156/275.5

FOREIGN PATENT DOCUMENTS

CN 1485146 A 3/2004
CN 1516727 A 7/2004
CN 1593936 A 3/2005
CN 2741745 Y 11/2005

* cited by examiner

*Primary Examiner*—Kiet T Nguyen
(74) *Attorney, Agent, or Firm*—Quintero Law Office

(57) ABSTRACT

An optical coating equipment, which includes a delivery device, a coater head, and an ultraviolet irradiative device. The delivery device delivers a film. A liquid coating is coated on the film by the coater head. The ultraviolet irradiative device includes a board assembly. When the coated film is delivered through the ultraviolet irradiative device, irradiative dose is controlled by the board assembly of the ultraviolet irradiative device.

17 Claims, 5 Drawing Sheets

OPTICAL COATING EQUIPMENT AND ULTRAVIOLET IRRADIATIVE DEVICE

BACKGROUND OF THE INVENTION

1. Field of the Invention

The invention relates to an optical coating equipment and an ultraviolet irradiative device, and in particular, to an ultraviolet irradiative device with covering boards which can adjust the irradiated area of an ultraviolet light source.

2. Description of the Related Art

FIG. 1 is a conventional optical coating equipment, comprising a film 1, a delivery device 2, a coater head 3, an oven 4, an ultraviolet irradiative device 5, and a cooling plate 6. The delivery device 2 comprises an unwinding machine 2*a* and a winding machine 2*b*. The film 1 is unwound by the unwinding machine 2*a*, and then the film 1 is coated with an optical liquid by the coater head 3. When the film 1 passes through the oven 4, an organic solvent of the optical liquid evaporates. The optical liquid is solidified by the ultraviolet irradiative device 5. Finally, the winding machine 2*b* winds the film 1 and formation of an optical film is complete.

The optical coating is a roll-to-roll coating method, thus the film 1 continuously passes through the oven 4 and the ultraviolet irradiative device 5 at the same velocity. Thus, the evaporation time of the organic solvent in the oven 4 and the irradiation time of the ultraviolet irradiative device will be changed simultaneously. To ameliorate this disadvantage, a conventional method, which changes the velocity of the unwinding machine 2*a* and the number of ovens, is provided. However, efficiency and capacity of the production are decreased by using this method. Another method, which adjusts the power of the ultraviolet light source by adjusting the distance between the film and the ultraviolet light source or a converter, is provided. Although the irradiative quantity is adjusted, the irradiative intensity of the ultraviolet light source is also changed. Thus, new variations occur.

Additionally, a great quantity of infrared rays are produced by the ultraviolet light source of the ultraviolet irradiative device 5, thus the surface temperature of the film 1 increases. Generally, a cooling plate 6 is disposed under the film 1 to cool the film 1. However, two opposite surface temperatures of the film 1 are different when passing through the ultraviolet irradiative device 5 and the cooling plate 6. Thus, the bottom of the film 1 is easily fogged.

BRIEF SUMMARY OF THE INVENTION

An optical coating equipment and an ultraviolet irradiative device are provided for adjusting irradiative dose of an ultraviolet light source by a covering board. Accordingly, an exemplary embodiment of an optical coating equipment comprises a delivery device, a coater head, and an ultraviolet irradiative device. The delivery device delivers a film. The coater head coats a liquid coating on the film. The ultraviolet irradiative device comprises a board assembly. When the coated film is delivered through the ultraviolet irradiative device, the irradiative dose is controlled by the board assembly of the ultraviolet irradiative device.

The ultraviolet irradiative device further comprises an ultraviolet light source and a sliding rail. The board assembly slides on the sliding rail. The board assembly slidably adjusts the irradiated area of the ultraviolet light source. The board assembly further comprises a plurality of covering boards. The covering boards are slidably disposed on the sliding rail.

The ultraviolet irradiative device further comprises a cooling unit. The cooling unit is disposed in the board assembly, to cool the top of the film. The cooling unit can also be disposed between the film and the board assembly, to cool the top of the film. The cooling unit further comprises a plurality of cooling pipes to regulate the temperature on the top of the film.

The ultraviolet irradiative device further comprises a cooling unit. The cooling unit is disposed under the film to cool the temperature on the bottom of the film. The cooling unit is a cooling plate. The board assembly is movably disposed in the ultraviolet irradiative device, moving reciprocatingly between the film and the irradiative light source.

The board assembly further comprises a plurality of first covering boards and a plurality of second covering boards. The first covering boards are securely disposed on the board assembly. The second covering boards are adjustably disposed on the board assembly, thus, the irradiative dose is adjusted by the first covering boards and the second covering boards.

Accordingly, an exemplary embodiment of an ultraviolet irradiative device for irradiating a film comprises a body, an ultraviolet light source, and a board assembly. The ultraviolet light source is disposed on the body. The board assembly is disposed under the irradiative ultraviolet light source and irradiative dose is controlled by the board assembly of the ultraviolet irradiative device. The board assembly further comprises a sliding rail and a plurality of covering boards. The covering boards are disposed on the sliding rail. The covering boards slide on the sliding rail to adjust the irradiated area of the ultraviolet light source.

The ultraviolet irradiative device further comprises a cooling unit. The cooling unit is disposed in the board assembly, to cool the top of the film. The cooling unit can also be disposed between the film and the board assembly, to cool the top of the film. The cooling unit further comprises a plurality of cooling pipes to regulate the temperature of the top of the film.

The ultraviolet irradiative device further comprises a cooling unit. The cooling unit is disposed under the film to cool the bottom of the film. The cooling unit is a cooling plate. The board assembly is movably disposed in the ultraviolet irradiative device, moving reciprocatingly between the film and the ultraviolet light source.

The board assembly further comprises a plurality of first covering boards and a plurality of second covering boards. The first covering boards are securely disposed on the board assembly. The second covering boards are adjustably disposed on the board assembly, thus, irradiative dose is adjusted by the first covering boards and the second covering boards.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

FIRST EMBODIMENT

Figure 1:
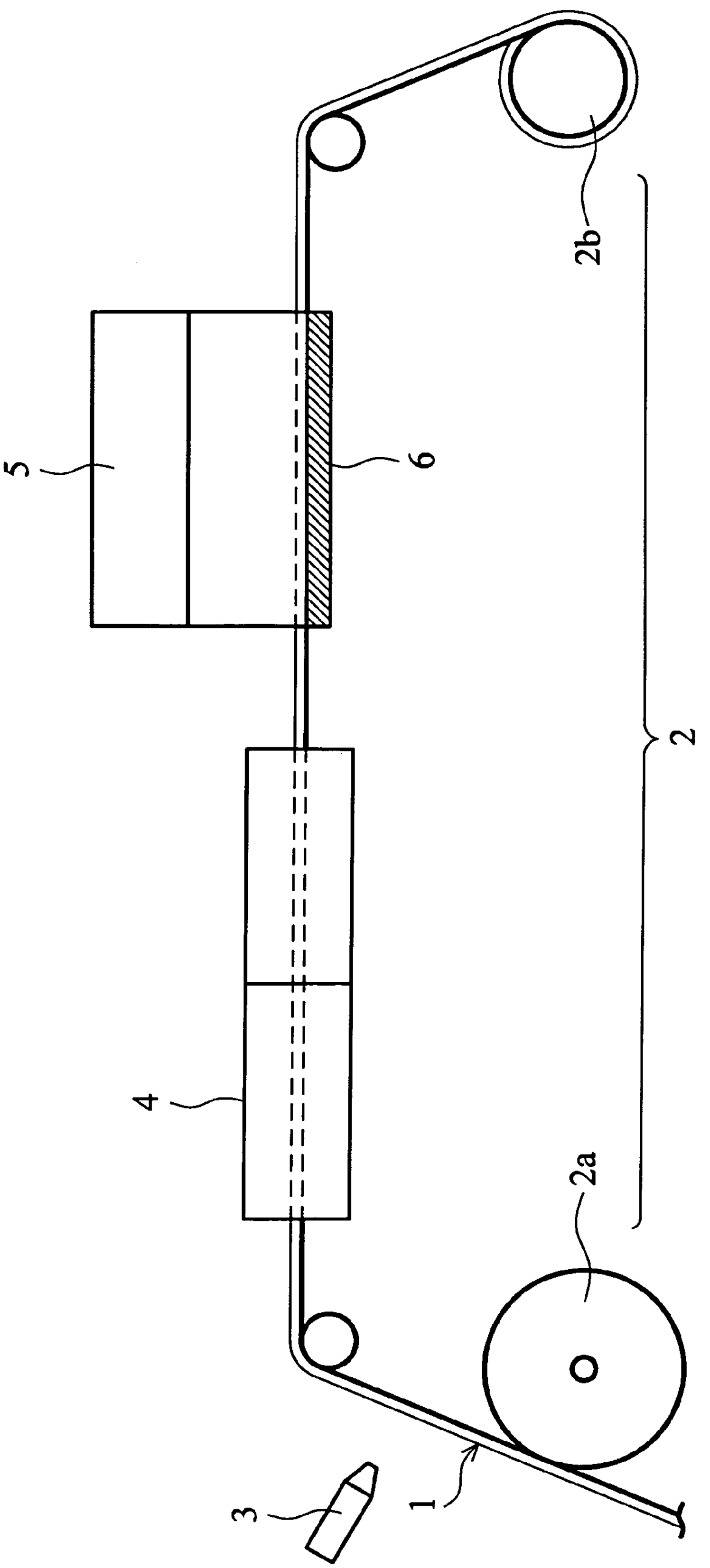
FIG. 1 (RELATED ART)
FIG. 1 is a schematic view of a conventional optical coating equipment.
Figure 2:
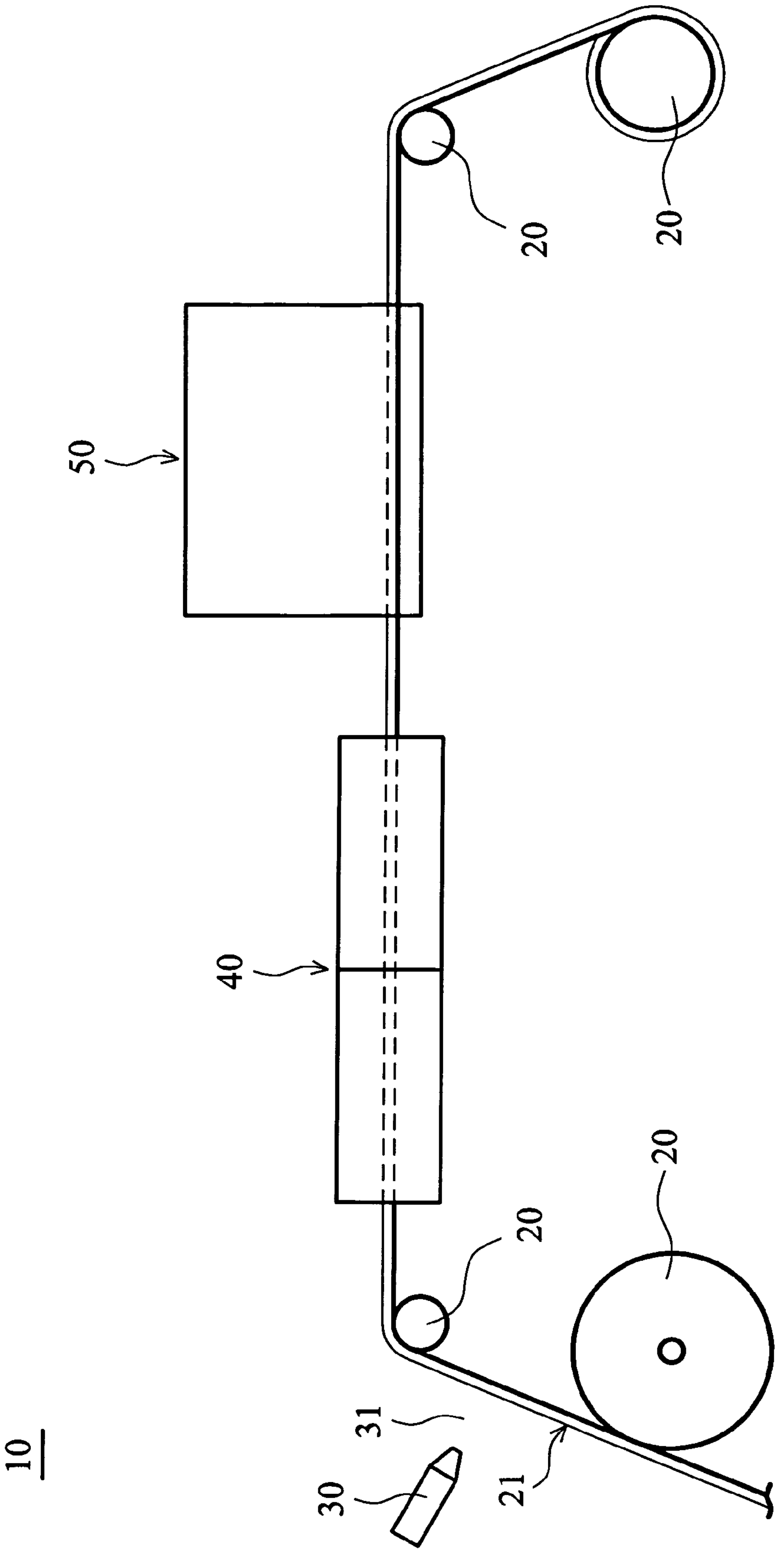
FIG. 2 is a schematic view of an embodiment of an optical coating equipment.
Figure 3:
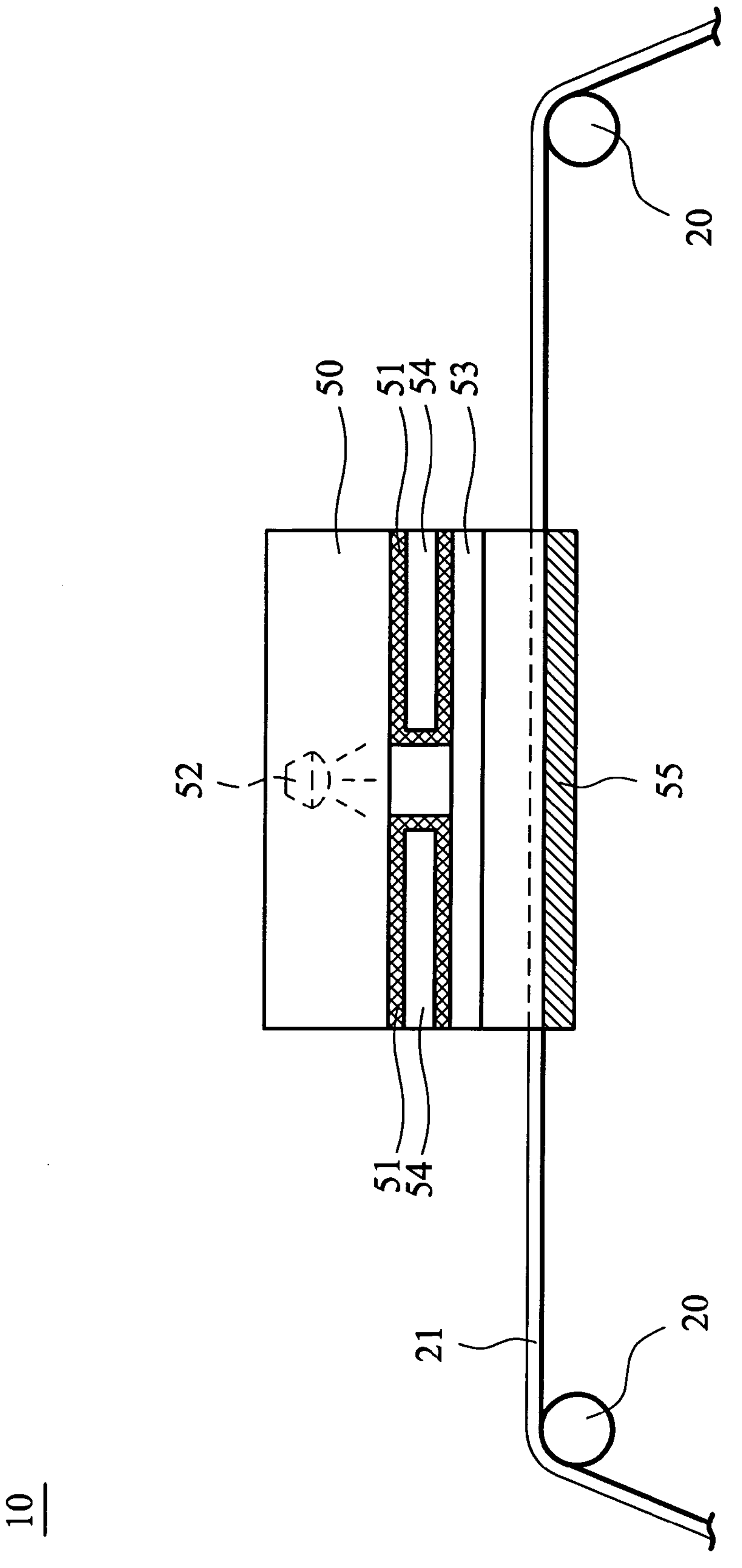
FIG. 3 is a schematic view of a first embodiment of an ultraviolet irradiative device in FIG. 2.

Referring to FIG. 2 and FIG. 3, an embodiment of an optical coating equipment 10 comprises a delivery device 20, a coater head 30, an oven 40, and a ultraviolet irradiative device 50. The delivery device 20 delivers a film 21. The coater head 30 coats an optical liquid 31 on the film 21. An organic solvent of the optical liquid 31 can be evaporated by the oven 40. The ultraviolet irradiative device 50 comprises a board assembly 51. When the film 21 coated with the optical liquid 31 passes through the ultraviolet irradiative device 50, the board assembly 51 adjusts the irradiated area which an ultraviolet light irradiates on the film 21 by the ultraviolet irradiative device 50.

Figure 4:
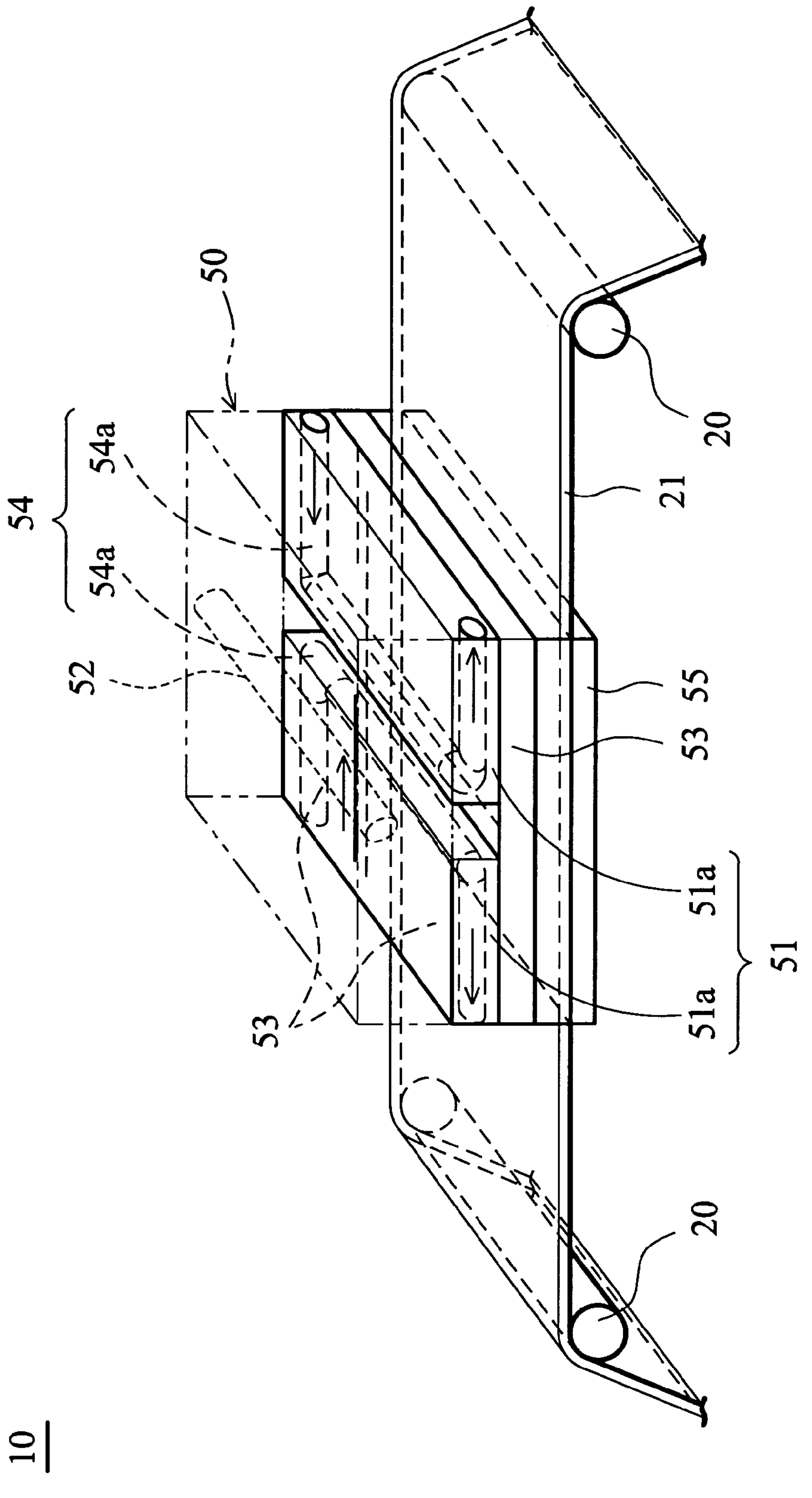
FIG. 4 is a 3-D schematic view of a first embodiment of the ultraviolet irradiative device in FIG. 2.

Referring to FIG. 4, the ultraviolet irradiative device 50 further comprises an ultraviolet light source 52, a sliding rail 53, a first cooling unit 54, and a second cooling unit 55.

The ultraviolet light source 52 provides the light for the film 21 coated with the optical liquid 31 to solidify the optical liquid 31. The board assembly 51 further comprises two covering boards 51*a*, which are movably disposed on the sliding rail 53. Two covering boards 51*a* are relatively moved to adjust the irradiated area of the ultraviolet light source 52. Thus, the irradiated time of the film 21 is changed. Additionally, the first cooling unit 54 comprises a plurality, of the first cooling pipes 54*a* which are disposed at the top of the film 21. Water circulating of the first cooling unit 54 can cool the temperature which is increased by heat produced from the ultraviolet light source 52. The second cooling unit 55 is disposed under the film 21, which can be a cooling plate, to reduce the temperature of the bottom of the film 21. The first cooling unit 54 and the second cooling unit 55 regulates the temperature of the top and the bottom of the film 21. Thus, the film 21 is prevented from being deformed, and the bottom of the film 21 is prevented from being fogged.

When the optical coating equipment 10 is operational, the film 21 is disposed on the delivery device 20, and coated with the optical liquid 31 by the coater head 30. Subsequently, the film 21 passes through the oven 40 for removing the organic solvent of the optical liquid 31. Furthermore, the film 21 passes through the ultraviolet irradiative device 50 for solidifying the optical liquid 31 of the film 21. When passing through the ultraviolet irradiative device 50, the board assembly 51 adjusts the irradiated area which the ultraviolet light irradiates on the film 21 by the ultraviolet irradiative device 50. The first cooling unit 54 and the second cooling unit 55 are operational to regulate the temperature of the film. Thus, deformation of the conventional film is reduced, and the quality of the film 21 is improved.

SECOND EMDODIMENT

Figure 5:
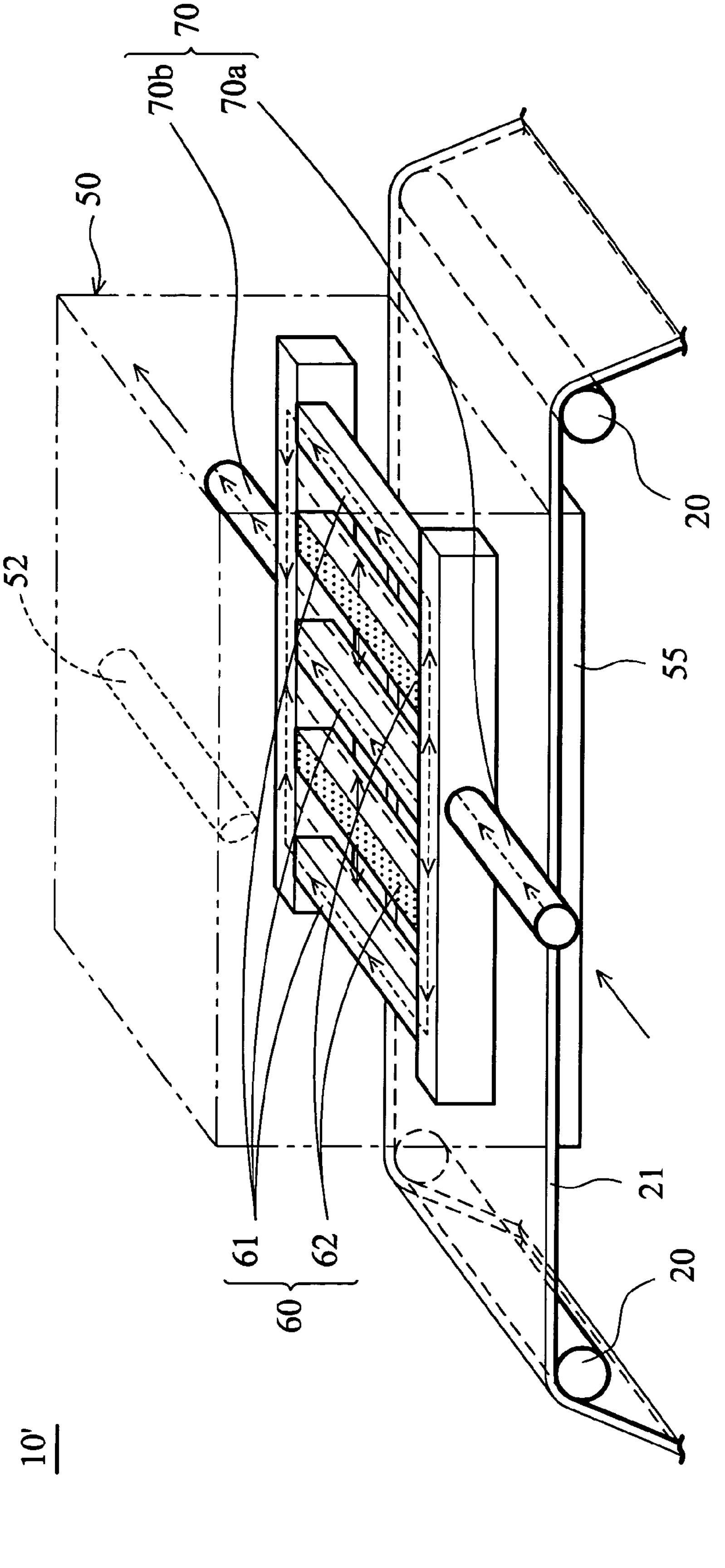
FIG. 5 is a schematic view of the second embodiment of an ultraviolet irradiative device in FIG. 2.

Referring to FIG. 5, most of the structures in a second embodiment are similar to those in the first embodiment, except for a board assembly 60 and a cooling pipe 70. The differences are described in the following.

The board assembly 60 comprises a plurality of first covering boards 61 and a plurality of second covering boards 62, moving reciprocatingly between the film 21 and the ultraviolet light source 52. The moving direction of the board assembly 60 is parallel to the moving direction of the film 21: The first covering board 61 is securely disposed on the board assembly 60. The second covering board 62 adjusts the irradiated area of the ultraviolet light source 52.

The cooling unit 70 further comprises a first cooling pipe 70*a* and a second cooling pipe 70*b*. Circulating water passes through the first cooling pipe 70*a*, the first covering board 61, and the second cooling pipe 70*b* in sequence, and then flows to a sink (not shown). The circulating water can be circulated for further use. The cooling unit 70 regulates the temperature of the top of the film 21 when the board assembly 60 moves recipocatingly to adjust the ultraviolet light source 52. The differences of the temperature between the top and the bottom of the film 21 are reduced to prevent the deformation of the film 21. Different from the first embodiment, the board assembly 60 moves recipocatingly, for more easily adjusting the irradiate area of the ultraviolet light source 52.

Note that the position of the board assembly 60 moves reciprocatingly between the ultraviolet light source 52 and the film 21, but is not limited to that depicted in FIG. 5, which can also rotate around the ultraviolet light source 52 or the film 21, to adjust the irradiated area.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical coating equipment, comprising:

a delivery device delivering a film;

a coater head coating an optical liquid on the film;

an ultraviolet irradiative device comprising:

a board assembly;

an ultraviolet light source; and a sliding rail, the board assembly sliding on the sliding rail, wherein the film is delivered through the ultraviolet irradiative device, the board assembly slidably adjusts an irradiated area on the film to control an irradiative dose which irradiates from the ultraviolet irradiative device to the film.

2. The optical coating equipment as claimed in claim 1, wherein the board assembly further comprises a plurality of covering boards, slidably disposed on the sliding rail.

3. The optical coating equipment as claimed in claim 1, wherein the ultraviolet irradiative device further comprises a cooling unit, disposed in the board assembly, to cool the temperature on the top of the film.

4. The optical coating equipment as claimed in claim 1, wherein the ultraviolet irradiative device further comprises a cooling unit, disposed between the film and the board assembly, to cool the top of the film.

5. The optical coating equipment as claimed in claim 4, wherein the cooling unit further comprises a plurality of cooling pipes, to regulate the temperature on the top of the film.

6. The optical coating equipment as claimed in claim 1, wherein the ultraviolet irradiative device further comprises a cooling unit, disposed under the film, to cool the underside of the film.

7. The optical coating equipment as claimed in claim 6, wherein the cooling unit is a cooling plate.

8. The optical coating equipment as claimed in claim 1, wherein the board assembly is movably disposed in the ultraviolet irradiative device, moving reciprocatingly between the film and the ultraviolet light source.

9. The optical coating equipment as claimed in claim 8, wherein the board assembly further comprises:

a plurality of first covering boards securely disposed on the board assembly; and a plurality of second covering boards adjustably disposed on the board assembly, wherein the first covering boards and the second covering boards adjust the irradiated area on the film to control the irradiative dose which irradiates from the ultraviolet irradiative device to the film.

10. An ultraviolet irradiative device for irradiating a film, comprising:

a body;

an ultraviolet light source disposed on the body; and a board assembly disposed under the ultraviolet light source,comprising:

a sliding rail; and a plurality of covering boards disposed on the sliding rail, wherein the covering boards slide on the sliding rail to adjust an irradiated area on the film to control an irradiative dose which irradiates from the ultraviolet irradiative device to the film.

11. The ultraviolet irradiative device as claimed in claim 10, wherein the ultraviolet irradiative device further comprises a cooling unit, disposed in the board assembly, to cool the top of the film.

12. The ultraviolet irradiative device as claimed in claim 10, wherein the ultraviolet irradiative device further comprising a cooling unit, disposed between the film and the board assembly, to cool the top of the film.

13. The ultraviolet irradiative device as claimed in claim 12, wherein the cooling unit further comprises a plurality of cooling pipes, to regulate the temperature on the top of the film.

14. The ultraviolet irradiative device as claimed in claim 10, wherein the ultraviolet irradiative device further comprises a cooling unit, disposed under the film, to cool the underside of the film.

15. The ultraviolet irradiative device as claimed in claim 14, wherein the cooling unit is a cooling plate.

16. The ultraviolet irradiative device as claimed in claim 10, wherein the board assembly is movably disposed in the body, moving reciprocatingly between the film and the ultraviolet light source.

17. The ultraviolet irradiative device as claimed in claim 16, wherein the board assembly further comprises:

a plurality of first covering boards securely disposed on the board assembly; and a plurality of second covering boards adjustably disposed on the board assembly, wherein the first boards and the second boards adjust the irradiated area on the film to control the irradiative dose which irradiates from the ultraviolet irradiative dose to the film.

* * * * *